(12) United States Patent
Kammer et al.

(10) Patent No.: US 9,117,108 B2
(45) Date of Patent: Aug. 25, 2015

(54) METHOD FOR CONTROLLING THE AUTHORIZATION OF A PERSON TO ACCESS A SECURE AREA

(71) Applicant: Diehl Aerospace GmbH, Überlingen (DE)

(72) Inventors: Olaf Kammer, Frankfurt (DE); Lothar Trunk, Weibersbrunn (DE); Jörg Waffenschmidt, Hofheim (DE)

(73) Assignee: Diehl Aerospace GMBH, Uberlingen (DE)

( * ) Notice: Subject to any disclaimer, the term of this patent is extended or adjusted under 35 U.S.C. 154(b) by 0 days.

(21) Appl. No.: 14/199,369

(22) Filed: Mar. 6, 2014

(65) Prior Publication Data

US 2014/0294255 A1 Oct. 2, 2014

(30) Foreign Application Priority Data

Mar. 26, 2013 (DE) .................. 10 2013 005 328

(51) Int. Cl.
*G06K 9/00* (2006.01)
*G07C 9/00* (2006.01)

(52) U.S. Cl.
CPC ........ *G06K 9/00221* (2013.01); *G07C 9/00142* (2013.01); *G07C 9/00158* (2013.01); *G07C 2209/08* (2013.01); *G07C 2209/14* (2013.01)

(58) Field of Classification Search
CPC .......... G07C 9/00158; G07C 9/00166; G07C 2209/08; G07C 9/00087; G07C 9/00142; G06K 9/00221; G06F 21/32
USPC ................................ 382/118, 116, 181, 125
See application file for complete search history.

(56) References Cited

U.S. PATENT DOCUMENTS

| 7,064,652 B2 * | 6/2006 | Junqua et al. ................ 340/5.84 |
| 2004/0061027 A1 | 4/2004 | Movsesian et al. |
| 2006/0126906 A1 * | 6/2006 | Sato et al. .................... 382/118 |

* cited by examiner

*Primary Examiner* — Mike Rahmjoo
(74) *Attorney, Agent, or Firm* — Scully, Scott, Murphy & Presser P.C.

(57) ABSTRACT

A method for controlling the authorization of a person to access a secure area, particularly a cockpit of a passenger aircraft, is provided. According to the method, an access control apparatus for detecting a set of biometric features is provided, which apparatus can be enabled by entering a predetermined access code. The access code is transferred by the person to the access control apparatus. The access control apparatus detects a set of biometric features of the person transferring the access code. The set of biometric features of the person are saved. Access for the person for a predetermined time period is subsequently enabled. Solely verifying the set of biometric features of the person seeking access allows access to be enabled again for the person during the predetermined time period.

12 Claims, 2 Drawing Sheets

METHOD FOR CONTROLLING THE AUTHORIZATION OF A PERSON TO ACCESS A SECURE AREA

BACKGROUND OF THE INVENTION

The invention relates to a method for controlling the authorization of a person to access a secure area of a passenger aircraft, for example of the cockpit.

DISCUSSION OF THE PRIOR ART

According to the prior art, an access control apparatus is used to protect, for instance, the door of a cockpit of a passenger aircraft against unauthorized access. By transferring to the access control apparatus a predetermined numeric code known to the members of the crew, if the access control apparatus has identified the entered numeric code to be correct, the members of the crew can open the door and gain access to the cockpit.

In passenger aircraft of more recent design, the passenger cabin is compartmentalized differently. In this case, the space in front of the cockpit is part of a compartment which is not meant to be frequented by the passengers and which can accommodate e.g. also toilets, a crew rest compartment or a galley, and is protected by an access control apparatus. Consequently, the members of the crew must enter this area far more frequently. It can also be the case that the members of the crew are carrying objects, e.g. trays or the like, in one or both hands, which makes it difficult to transfer a numeric code, e.g. by touching keys on a keypad.

SUMMARY OF THE INVENTION

The object of the invention is to eliminate the disadvantages according to the prior art. In particular, a method shall be defined that enables an authorized person to access a secure area as quickly and easily as possible.

According to the invention, for the purpose of controlling the authorization of a person to access a secure area, in particular a cockpit of a passenger aircraft, a method is proposed comprising the following steps:

providing an access control apparatus for detecting a set of biometric features, which apparatus can be enabled by entering a predetermined access code, transfer of the access code by the person to the access control apparatus, detecting by means of the access control apparatus a set of biometric features, for example biometric features of the face, of the person transferring the access code, saving the set of biometric features of the person, and subsequently enabling access for the person for a predetermined time period, wherein verifying the set of biometric features of the person seeking access allows access to be enabled again for the person during the predetermined time period.

In addition to verification, an activation trigger event can also be requested. Such an activation trigger event can involve, in particular, the person making a deliberate and also required action or movement or other operation. This has the advantage that unintentionally enabling access can be avoided by using the activation trigger event. Only the cumulative existence of the activation trigger event and the match between the biometric features and the features saved in the database allows access to be enabled. Further measures for avoiding unintended clearance can be implemented in order to prevent, for example, access being enabled on passing by the secure area, which is what the activation trigger event is also used to prevent.

Within the meaning of the present invention, the access code is a code that is stored in the access control apparatus. The access code can be changed. Changing the access code, however, is possible only for specially authorized persons, who in particular are not members of the crew. The access code is usually valid over a longer time period than the predetermined time period. The access code can be a code composed of numbers and/or letters and which can be transferred to the access control apparatus by touching relevant keys of a keypad. The access code can, however, also be stored on a magnetic strip, a transponder or the like, which e.g. is part of an identification card.

After entering the access code correctly, the person concerned is requested to assume a position suitable for detection and/or extraction of the biometric features, for example the person can be requested to face into a camera. From the detected information, for example a captured picture, a set of biometric features specific to the person is created on the basis of a predetermined algorithm, and saved. Simultaneous with or in conjunction with the extraction of the biometric features or with the clearance based on the access code, a time measurement starts to run. Then, i.e. at least after detecting a region required for extracting the biometric data, the person concerned is granted access to the secure area, in particular on the basis solely of the access code.

If the person now seeks to access the secure area again during the predetermined time period, which, for instance, is equal to the length of a work shift, this access is already granted when a check of the biometric features of the person results in a match between these features and a saved set of biometric features. For this purpose, for instance, it is merely necessary that the person concerned looks into the camera, and the biometric features are detected and extracted on the basis of this and compared with the saved set(s) of biometric data. If the detected biometric data matches an already saved set of data, then the person concerned is granted access. Thus in the repeat situation, access to the secure area during the predetermined time period is easily and quickly possible, in particular it can avoid the need for the person to re-enter the access code, which is not always possible in the service area, for instance, if the person concerned e.g. does not have a hand free for entering the access code.

The secure area may be a room. The room may be in particular a compartment in a vehicle, preferably in an aircraft.

The method according to the invention, however, is also suitable for controlling access to other areas requiring protection, e.g. a data processing facility or the like.

The overall result of the proposed method is that on or after entering the access code, person-specific biometric features are detected and saved, and that the biometric features are used as a substitute for the access code at least for the predetermined time period. Entering the access code is thus suitable for initiating the detection of the biometric features and associating these features with the access code e.g. for a time-limited period, in particular in such a way that access to the secure area can be made by entering the access code, and advantageously according to the invention also without repeated entry of the access code, solely on the basis of the biometric data. In particular, this can also be seen to have the advantage that any changes in the biometric features which may occur, e.g. in the face of a person, do not need to be taken into account.

Thus the proposed method can be used to achieve at least temporary conversion of an access authorization that requires activation by hand, i.e. manual activation, into an access authorization that can be activated without involving touching, in particular on the basis of biometric data or features. In a generalization of the concept according to the invention, it would also be possible in particular to replace the access code by any form of person-specific information, it also being possible here to use information read from an active or passive memory which is carried on the person, or to use other information. Using an access code that has to be entered manually has the advantage that deliberate enabling must be performed at least once. It can thereby be avoided that access is enabled automatically on the basis of e.g. biometric data even though the person concerned does not intend to gain access.

According to an advantageous embodiment of the invention, the access code is a numeric code. It can be stored on a data storage medium, preferably on a magnetic strip or a transponder. The access code is advantageously specific to the person or a group of people to which the person belongs. For instance, a numeric code such as e.g. "2234" can be known to the crew of a passenger aircraft as the access code.

The access control apparatus determines the biometric features preferably from the face or the facial features of the person, for example on the basis of a predetermined algorithm.

According to a further advantageous embodiment of the method, renewed access to the secure area after the predetermined time period has elapsed is only possible after the renewed transfer of the access code. Using facial biometric data is applicable in particular to the situation in the cabin of a commercial aircraft, because the face or the facial features of the person concerned are normally accessible in the aircraft, in particular are not covered by items of clothing. Using facial features in particular also has the advantage that it requires for the purpose of determining the biometric data an active and deliberate action by the person concerned which can involve, for example, looking into a specially arranged camera. Thus accidental access clearance can largely be avoided.

Embodiments provide that after the predetermined time period has elapsed, the access authorization based on the biometric data becomes invalid, and the access code must be re-entered in order to enable access.

In embodiments, the access code is specific to a person or an entire group of people. For a group of people, the expiry time, i.e. the predetermined time period, can be set separately for each person.

The scope of the invention is also intended to include embodiments in which repeated, successive access shall be possible even without detecting and saving the biometric data. In this case, however, it would be necessary to enter the access code for each access sought.

In a variant of operation, it would be possible that after entering, in particular entering manually, the access code, the person is asked in which way enabling shall be performed in future, in particular for the predetermined time period. It is possible in this case, for instance, that the person can select whether the access code is still meant to be used for enabling access for the predetermined time period, or whether biometric data is meant to be used instead. When the selection is to use biometric data for enabling, the biometric data is detected and saved. Reference is made to the above embodiments in this regard.

BRIEF DESCRIPTION OF THE DRAWINGS

The invention is described in greater detail below with reference to the drawings, in which.

DETAILED DESCRIPTION OF THE INVENTION

The method according to the invention can be used, for example, to safeguard access to a specific compartment, e.g. to an area that includes the cockpit, or to other areas or sections in a passenger aircraft. Possible uses include, in particular, access security systems for VIP aircraft or VIP areas, and safeguarding or restricting access to First Class, the galley, crew rest compartments, toilets, lavatories, sectors containing technical equipment or machinery, etc.

For this purpose, the compartment concerned can be locked by a door. The door is secured by a lock that can be opened by an electronic access control apparatus. The access control apparatus can be a computer having a camera and a touchscreen, wherein the touchscreen displays a keypad composed of numbers and/or letters and is designed to allow a person/user to enter a sequence of numbers and/or letters by manual operation. In particular the method represented in FIGS. 1 and 2 in the form of flow charts can be implemented by the access control apparatus.

Figure 1:
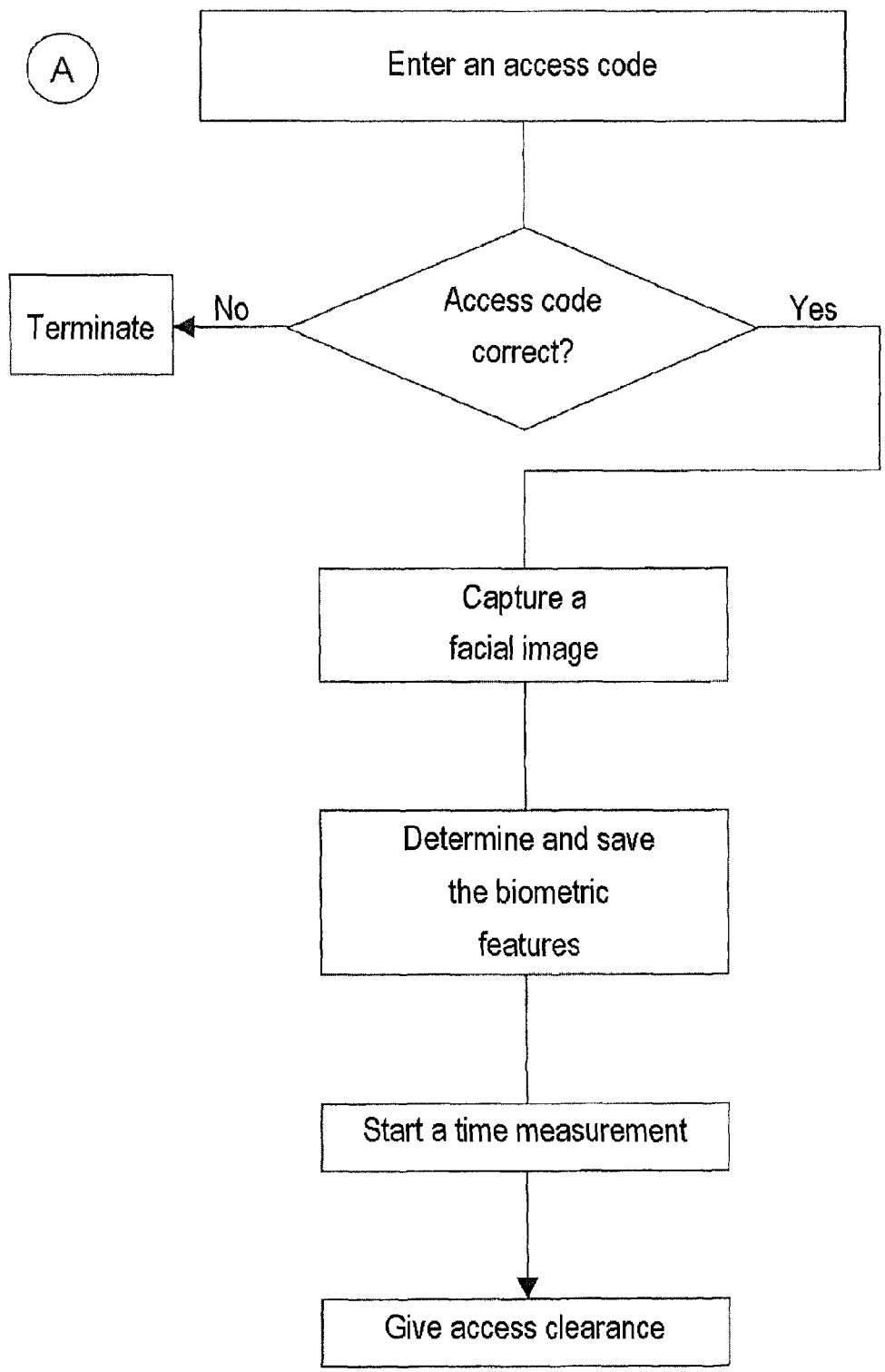
FIG. 1 shows a first flow chart "A"

FIG. 1 shows the method steps that can be performed to gain access for the first time to the secure area. An authorized person knows an access code stored in the access control apparatus. This code may be a sequence of numbers such as "2234", for example.

In a first step, the person concerned enters the access code, for instance by touching the relevant numbers on the keypad displayed on the touchscreen.

The computer compares the entered access code with the stored access code. If the entered access code does not match the stored access code, the method is terminated and, if applicable, restarted.

If the entered access code matches the stored access code, the person concerned is requested to face into a camera, i.e. the person is requested to assume a position for biometric feature extraction.

In a variant of operation, it would be possible to ask the person whether the access code is still meant to be used for enabling access, or whether biometric data is meant to be used instead for the predetermined time period.

In the case where biometric access control is used, the access control apparatus can now be used to produce an image or representation of the face or facial features of the person. Then the biometric features of the face are determined or extracted on the basis of the image or directly from the face or the facial features, and saved in a database, in particular in a memory. Simultaneous with or in conjunction with this, a time measurement is started. Clearance is given for access to the secure area. Clearance can be given by the access control apparatus opening briefly the lock on the door.

Figure 2:
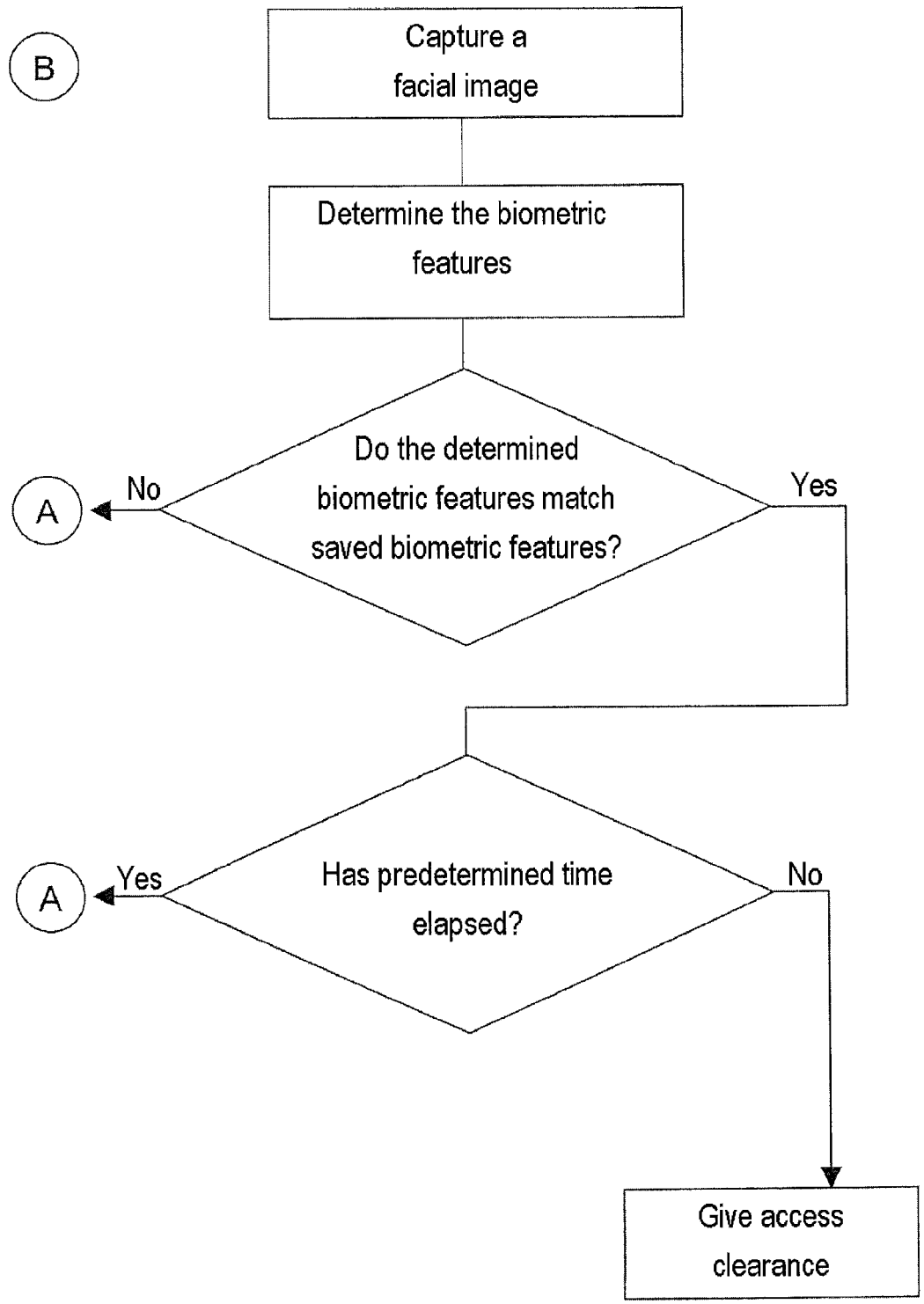
FIG. 2 shows a second flow chart "B".

FIG. 2 shows the steps of a method "B", which is executed when the access control is meant to be performed on the basis of the biometric features, and the person seeks access to the secure area once again. As a result of an activation trigger event, in a first step, an image of the face of the person seeking access is again produced, or biometric features of the triggering person are detected and determined The determined set of biometric features is then compared with the further sets of biometric features saved in the database.

If the set of determined biometric features does not match any of the further sets of biometric features, the method "A" is started.

If the set of biometric features matches one of the sets of biometric features saved in the database, a check is made to establish whether a predetermined time period associated with this set of biometric features has elapsed. This can be done by comparing the time measurement started in the method "A" with a predetermined time period, for example 8 hours. If it is established that the predetermined time has elapsed, the method "A" (see FIG. 1) is started.

If the predetermined time period has not yet elapsed, the person is cleared to access the secure area.

What is claimed is:

1. A method for controlling the authorization of a person to access a secure area, comprising the following steps:
    providing an access control apparatus for detecting a set of biometric features, which apparatus can be enabled by entering a predetermined access code,
    transferring the access code by the person to the access control apparatus,
    detecting by means of the access control apparatus a set of biometric features of the person transferring the access code, wherein the set of biometric features comprise facial features,
    saving the set of biometric features of the person, and subsequently enabling access for the person for a predetermined time period,
    wherein solely verifying the set of biometric features of the person seeking access allows access to be enabled again for the person during the predetermined time period,
    wherein the biometric features are saved only during the predetermined time period, and after the renewed transfer of the access code are detected again and saved for a further predetermined time period.

2. The method according to claim 1, wherein the secure area is a room.

3. The method according to claim 2, wherein the room is a compartment in a vehicle.

4. The method according to claim 3, wherein said vehicle is an aircraft.

5. The method according to claim 1, wherein the secure area is a data processing facility.

6. The method according to claim 1, wherein the access code is a numeric code.

7. The method according to claim 1, wherein the access code is stored on a data storage medium.

8. The method according to claim 7, wherein said data storage medium is a magnetic strip or a transponder.

9. The method according to claim 1, wherein the access code is specific to the person or a group of people to which the person belongs.

10. The method according to claim 1, wherein the biometric features are determined from the face of the person.

11. The method according to claim 10, wherein said biometric features are determined on the basis of a predetermined algorithm.

12. The method according to claim 1, wherein renewed access to the secure area after the predetermined time period has elapsed is only possible after the renewed transfer of the access code.

* * * * *